United States Patent [19]

Kobayashi

[11] Patent Number: 5,583,718
[45] Date of Patent: Dec. 10, 1996

[54] REEL UNIT APPARATUS WITH SENSOR DETECTING REEL ROTATION THROUGH OPENINGS IN MOVABLE BASE AT PLURAL POSITIONS THEREOF

[75] Inventor: Junji Kobayashi, Tokyo, Japan

[73] Assignee: Canon Kabushiki Kaisha, Tokyo, Japan

[21] Appl. No.: 331,755

[22] Filed: Oct. 31, 1994

[30] Foreign Application Priority Data

Nov. 2, 1993 [JP] Japan .................................. 5-274380

[51] Int. Cl.$^6$ ........................ G11B 15/00; G11B 15/54
[52] U.S. Cl. ...................... 360/94; 360/96.3; 360/73.04; 242/336; 242/357
[58] Field of Search .......................... 360/94, 96.3, 69, 360/71, 73.04; 242/336, 342, 345, 337, 337.1, 357, 333.6

[56] References Cited

U.S. PATENT DOCUMENTS

| | | | |
|---|---|---|---|
| 3,619,625 | 11/1971 | Wood | 360/71 |
| 4,589,045 | 5/1986 | Koyama | 360/137 |
| 4,644,436 | 2/1987 | Unno | 360/71 |
| 4,903,149 | 2/1990 | Hasegawa et al. | 360/94 |
| 4,984,109 | 1/1991 | Yokoo | 360/94 |
| 5,087,993 | 2/1992 | Kobayashi | 360/71 |
| 5,177,646 | 1/1993 | Lee | 360/60 |
| 5,251,080 | 10/1993 | Matsuoka et al. | 360/85 |

FOREIGN PATENT DOCUMENTS 62-134841  6/1987  Japan .................................. 360/96.3

*Primary Examiner*—Stuart S. Levy
*Assistant Examiner*—Craig A. Renner
*Attorney, Agent, or Firm*—Fitzpatrick, Cella, Harper & Scinto

[57] ABSTRACT

A rotator moving apparatus has a supporting mechanism for rotatably supporting a rotator. A moving mechanism moves the supporting mechanism to a plurality of positions. A base supports the moving mechanism. An object to be detected is arranged on the rotator. A detecting section is arranged on the base so as to detect the object. A regulation mechanism regulates a plurality of positions to which the supporting mechanism moves so that the rotation path of the object falls within the range which faces the detecting section.

16 Claims, 5 Drawing Sheets

5,583,718

REEL UNIT APPARATUS WITH SENSOR DETECTING REEL ROTATION THROUGH OPENINGS IN MOVABLE BASE AT PLURAL POSITIONS THEREOF

BACKGROUND OF THE INVENTION

1. Field of the Invention

The present invention relates to a rotator moving apparatus which is capable of detecting the rotation of a rotator, the rotation center of which is movable.

2. Description of the Related Art

Conventionally, the following type of apparatus is available for detecting the rotation of a rotator, the rotation center of which is movable. For example, a cassette loading apparatus is constructed such that a reel unit is movable so as to be capable of loading two types of cassettes, thereby detecting the rotation of the reel unit. In such an apparatus, a rotation detecting section is provided for a reel unit base having the reel unit mounted thereon so that it is moved together with the reel unit.

However, the above-noted conventional apparatus presents the following problems. First, the rotation detecting section moves together with the reel unit as described above, thereby making the wiring more complicated and assembly more difficult, leading to accidental breakage of the wiring while the reel unit is moving. Second, the complicated wiring and difficult assembly make the apparatus more expensive due to an increase in the number of parts.

SUMMARY OF THE INVENTION

Accordingly, an object of the present invention is to provide a rotator moving apparatus with high performance which can solve the foregoing problems.

Another object of the present invention is to provide a rotator moving apparatus which is simple in construction.

Still another object of the present invention is to achieve a cost reduction in the manufacture of a rotator moving apparatus.

In order to achieve the above objects, according to one embodiment of the present invention, there is provided a rotator moving apparatus comprising: (a) supporting means for rotatably supporting a rotator; the rotator being adapted to support an object to be detected; (b) moving means for moving the supporting means to a plurality of positions; (c) a base for supporting the moving means; (d) a detecting section arranged on the base so as to detect the object; and (e) regulating means for regulating the plurality of positions to which the supporting means moves so that the rotation path of the object falls within a range which faces the detecting section, thereby detecting the rotation of the rotator. With such a construction, it is possible to provide a rotator moving apparatus with high performance which is simple in construction and easy to assemble. Cost reduction is also achieved due to a decrease in the number of parts.

Further objects, features and advantages of the present invention will become apparent from the following description of the preferred embodiment with reference to the attached drawings.

DESCRIPTION OF THE PREFERRED EMBODIMENT

The construction of an embodiment of the present invention will now be described with reference to the drawings. This embodiment is applied to a magnetic recording and/or reproducing apparatus for recording and/or reproducing information on or from a magnetic tape in a cassette obtained by winding the magnetic tape around a pair of reels by means of a head attached to a rotator drum.

Figure 1:
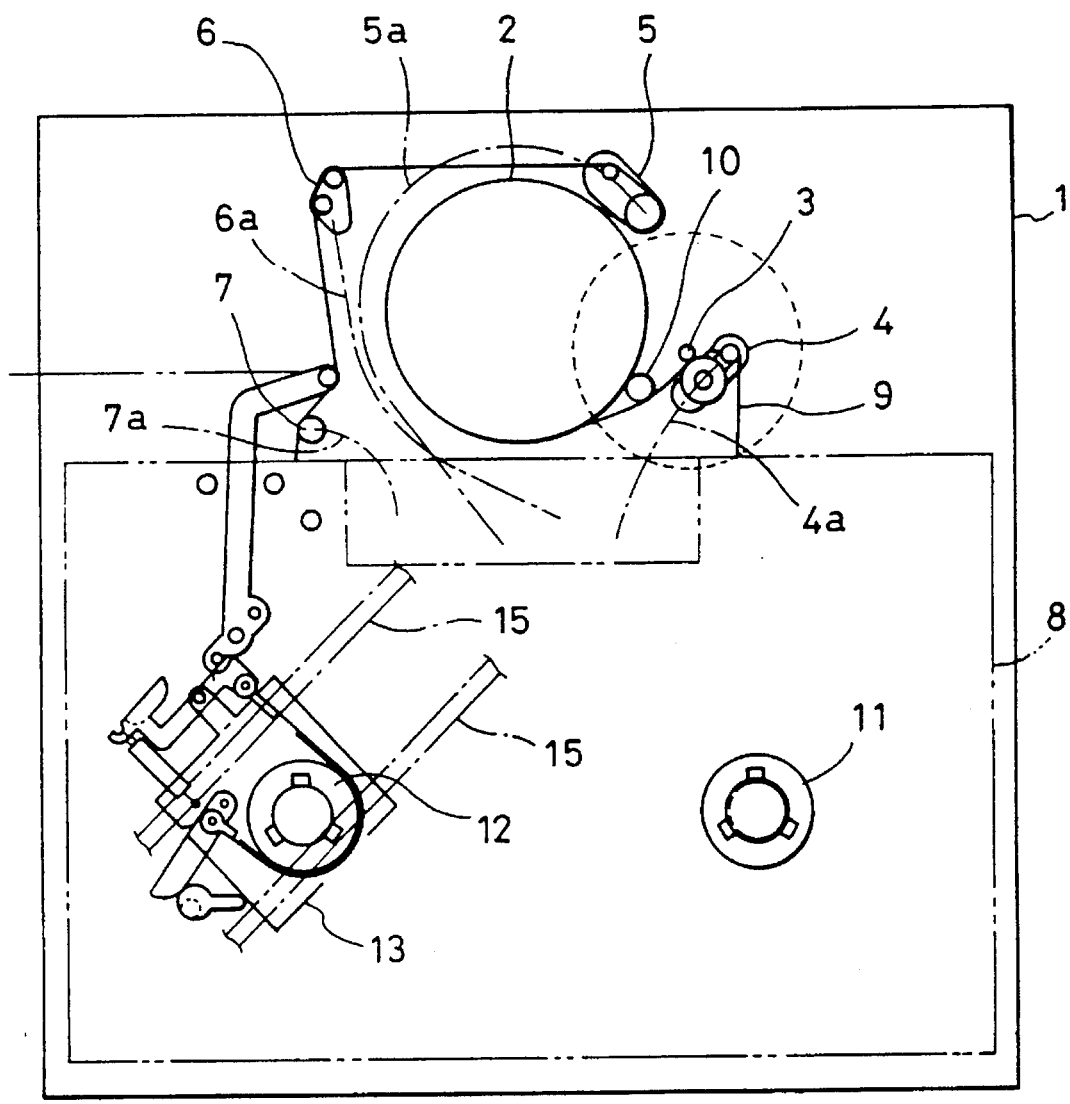
FIG. 1 is a schematic view of the construction of a magnetic recording and/or reproducing apparatus having a large cassette loaded therein according to an embodiment of the present invention.

FIG. 1 is a schematic view of the construction of a magnetic recording and/or reproducing apparatus according to this embodiment. The magnetic recording and/or reproducing apparatus includes a chassis 1, a rotator drum 2 mounted on the chassis 1, a capstan 3, a pinch skate 4 having a pinch roller mounted thereon, a leading skate 5, a trailing skate 6 and a cassette post 7. The pinch skate 4, the leading skate 5, the trailing skate 6 and the cassette post 7 are adapted to move along movement paths 4$a$, 5$a$, 6$a$ and 7$a$, respectively. A tape 9 is pulled from a large cassette 8 loaded in the chassis 1 and wound around the rotator drum 2 and an outlet post 10, as shown in FIG. 1.

The recording and/or reproducing apparatus also includes a take-up reel unit 11 and a feed reel unit 12 which are placed on a take-up reel unit base (not shown) and a feed reel unit base 13, respectively.

Figure 2:
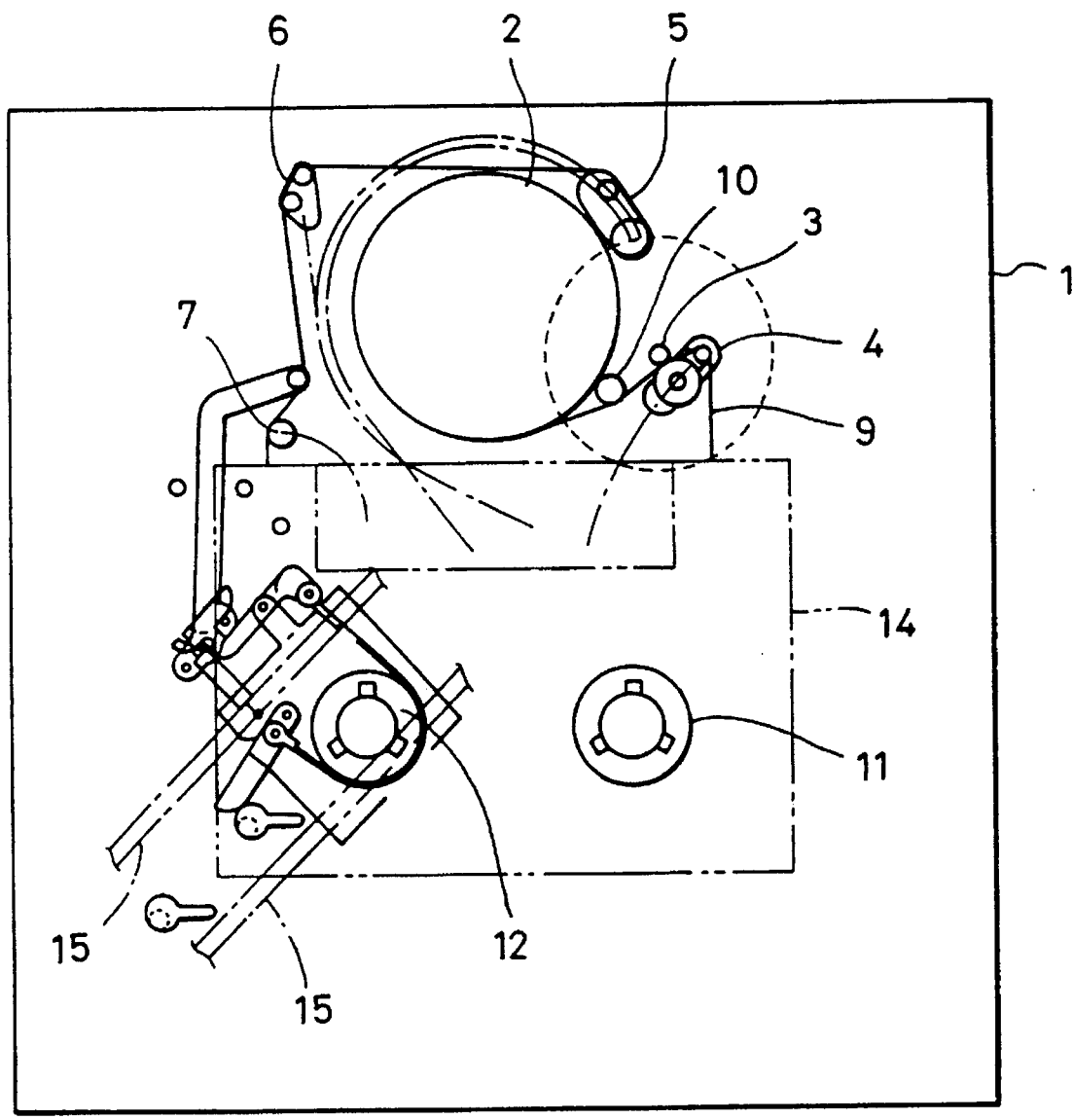
FIG. 2 is a schematic view of the construction of a magnetic recording and/or reproducing apparatus having a small cassette loaded therein according to an embodiment of the present invention.

The take-up reel unit base and the feed reel unit base 13 are movable along rails 15 so as to be compatible with a small cassette 14 loaded in the chassis 1, as illustrated in FIG. 2. In this way, such bases are adapted to be placed in predetermined positions so as to be compatible with the large cassette 8 and the small cassette 14 shown in FIGS. 1 and 2, respectively.

Figure 3:
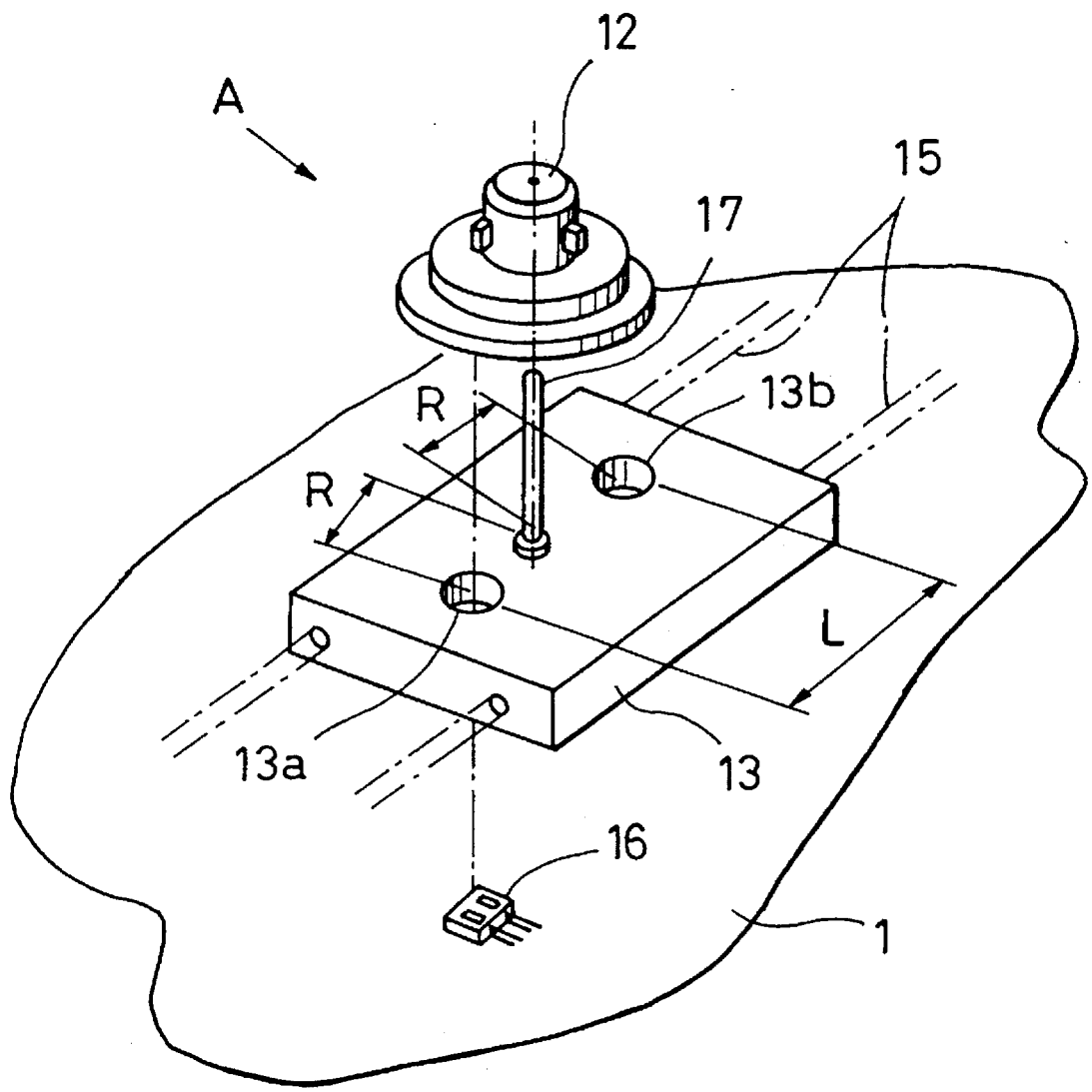
FIG. 3 illustrates in detail a reel mechanism of an embodiment of the present invention.

A description will now be given of a reel mechanism. In FIG. 3, a reflective photo diode 16 is mounted on the chassis 1 and connected to a detection process circuit (not shown). The reel unit base 13 is adapted to be movable along the rails 15 placed on the chassis 1 depending on the cassette size, that is, according to a variation in the distance between the centers of the tape reels. The reel unit base 13 is provided with openings 13$a$ and 13$b$ for detecting the rotation of the reel unit in two positions at a distance R away from a reel shaft 17 in the direction of moving the reel unit base 13.

Figure 4:
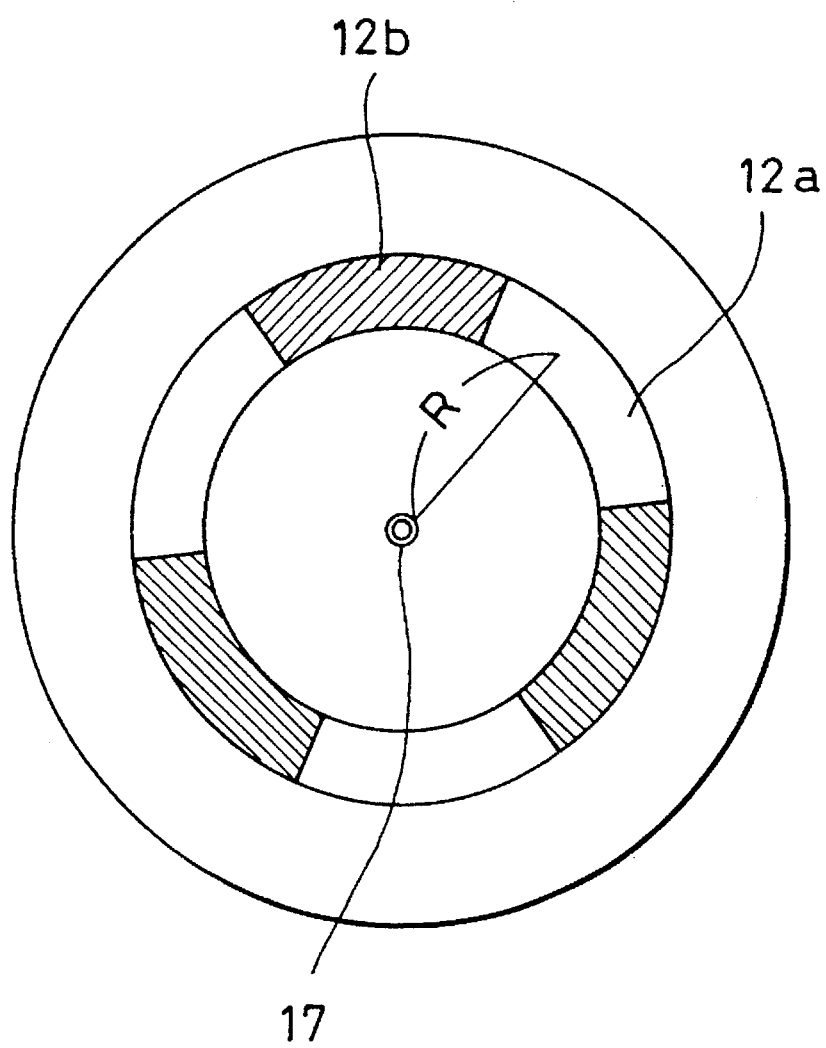
FIG. 4 is a rear view of a reel unit of an embodiment of the present invention.

When these openings 13$a$ and 13$b$ are provided such that an imaginary line connecting the openings 13$a$ and 13$b$ passes through the reel shaft 17 and is parallel to the rails 15, the equation 2R=L can be met. The present invention can be accomplished by providing the openings 13$a$ and 13$b$ so that the line connecting the openings 13$a$ and 13$b$ is parallel to the direction of moving the reel unit base 13. As illustrated in FIG. 4, on the reverse surface of the reel unit 12 (the surface facing the reel unit base 13), a plurality of silver reflective surfaces 12$a$ and black non-reflective surfaces 12$b$ are alternately arranged around the entire periphery at the distance R away from the center of the reel unit 12.

Figure 5A:
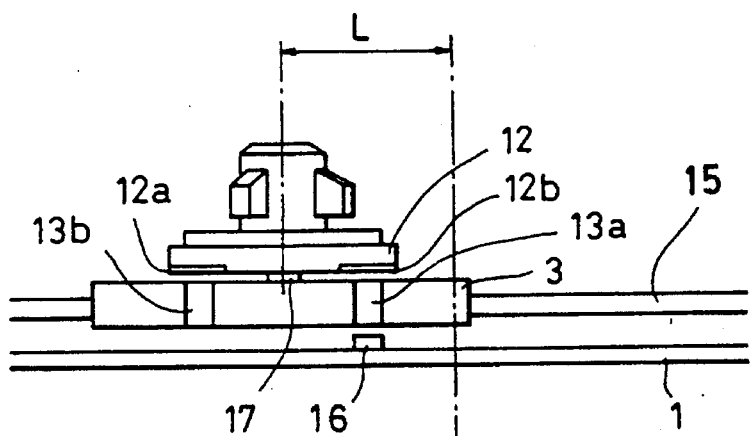
FIGS. 5($a$–$b$) illustrate a reel unit rotation detecting mechanism of an embodiment of the present invention.
Figure 5B:
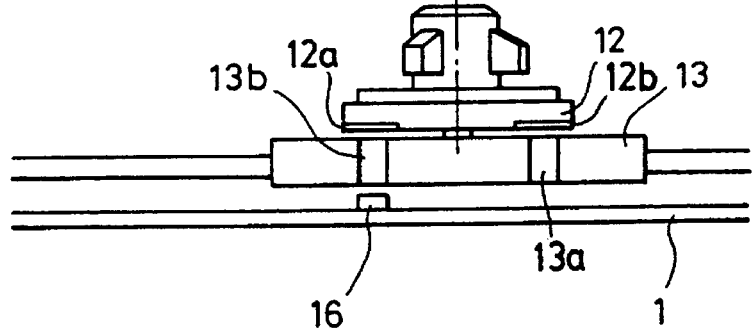

FIGS. 5(a) and 5(b) illustrate the reel mechanism as viewed in the direction indicated by the arrow A in FIG. 3. As illustrated in FIGS. 5(a) and 5(b), when one of the forward and rear ends of the reel unit base 13 is positioned at one end of the distance L in which the reel unit base 13 is movable, the reflective photo diode 16 mounted on the chassis 1 is positioned right under one of the respective openings 13a and 13b of the reel unit base 13. FIG. 5(a) is a side view showing the positional relationship among the reel unit base 13 having the small cassette 14 shown in FIG. 2 loaded therein, the reel unit 12 and the reflective photo diode 16. The reflective photo diode 16 is positioned right under the opening 13a of the reel unit base 13. As described above, the reflective surfaces 12a and the non-reflective surfaces 12b are alternately arranged on the surface of the reel unit 12 which faces the reel unit base 13. The light emitted from the reflective photo diode 16 thus passes through the opening 13a so as to reach the reel unit 12.

When the light reaching the reel unit 12 from the photo diode 16 is applied to the reflective surface 12a, it is received by the photo diode 16. The light applied to the non-reflective surface 12b is not received. More specifically, when the reel unit 12 is rotated, the light from the photo diode 16 is alternately applied to the reflective surface 12a and the non-reflective surface 12b so that it repeats reflection and non-reflection, thereby detecting the rotation of the reel unit 12 by the light-receiving section of the reflective photo diode 16. On the other hand, when the reel unit 12 is not rotated, the light emitted from the reflective photo diode 16 is always received by the light-receiving section of the photo diode 16 when the light is applied to the reflective surface 12a, while the light is not received at all when the light is applied to the non-reflective surface 12b.

FIG. 5(b) is a side view showing the positional relationship among the reel unit base 13 having the large cassette 8 shown in FIG. 1 loaded therein, the reel unit 12 and the reflective photo diode 16 mounted on the chassis 1. The photo diode 16 is positioned right under the opening 13b of the reel unit base 13. The detection of the rotation of the reel unit 12 can also be achieved in a manner similar to the operation illustrated in FIG. 5(a).

As described above, in the reel unit moving apparatus which is capable of loading large and small types of cassettes, rotation detecting means conventionally arranged on the moving base are replaced by the reflective photo diode arranged on the chassis, thereby improving assembly by simplifying wiring and enabling cost reduction by decreasing the number of parts. The rotation detecting element is not limited to a reflective photo diode, but may be a hall element by way of example, in which case, a magnet should be placed on the lower surface of the reel unit 12 which faces the reel unit base 13.

What is claimed is:

1. A reel unit apparatus comprising:
   (a) a reel unit having a detectable object provided thereon;
   (b) a first base rotatably supporting said reel unit about an axis of rotation;
   (c) moving means for moving said first base to a plurality of positions along a direction of movement to thereby move said axis of rotation of said reel unit to said plurality of positions;
   (d) a second base supporting said moving means to movably support said first base;
   (e) a plurality of openings formed in said first base so that a spacing thereof is parallel to the direction of movement of said first base; and
   (f) detecting means arranged on said second base for detecting rotation of said reel unit at said plurality of positions by detecting movement of the detectable object, provided on said reel unit, through said openings formed in said first base.

2. A reel unit apparatus according to claim 1, wherein said moving means comprises a guide rail.

3. A reel unit apparatus according to claim 2, wherein said guide rail is placed on a straight line.

4. A reel unit apparatus according to claim 1, wherein said detecting means comprises a light-emitting portion and a light-receiving portion.

5. A reel unit apparatus according to claim 4, wherein said detectable object comprises a reflective portion and a non-reflective portion.

6. A reel unit apparatus according to claim 1, wherein said reel unit accommodates cassettes of different sizes.

7. A reel unit apparatus according to claim 6, wherein said plurality of positions includes first and second positions corresponding to said cassettes of different sizes, said first base is movable between said first and second positions.

8. A reel unit apparatus according to claim 7, wherein said detectable object is provided at a position displaced from said axis of rotation by one half of a movement distance of said first base.

9. A recording and/or reproducing apparatus comprising:
   (a) means for at least one of recording on and reproducing from a recording medium;
   (b) a reel unit having a reel rotatably mounted thereon about an axis of rotation, said reel having a detectable object provided thereon, said reel unit winding said recording medium around said reel;
   (c) a first base supporting said reel unit;
   (d) moving means for moving said first base to a plurality of positions along a direction of movement to thereby move said axis of rotation of said reel to said plurality of positions;
   (e) a second base supporting said moving means to movably support said first base;
   (f) a plurality of openings formed in said first base so that a spacing thereof is parallel to the direction of movement of said first base; and
   (g) detecting means arranged on said second base for detecting rotation of said reel at said plurality of positions by detecting movement of the detectable object, provided on said reel, through said openings formed in said first base.

10. A recording and/or reproducing apparatus according to claim 9, wherein said moving means comprises a guide rail.

11. A recording and/or reproducing apparatus according to claim 10, wherein said guide rail is placed on a straight line.

12. A recording and/or reproducing apparatus according to claim 9, wherein said detecting means comprises a light-emitting portion and a light-receiving portion.

13. A recording and/or reproducing apparatus according to claim 12, wherein the detectable object comprises a reflective portion and a non-reflective portion.

14. A recording and/or reproducing apparatus according to claim 9, wherein said reel unit accommodates cassettes of different sizes.

15. A recording and/or reproducing apparatus according to claim 14, wherein said plurality of positions includes first and second positions corresponding to said cassettes of different sizes, said first base is movable between said first and second positions.

16. A recording and/or reproducing apparatus according to claim 15, wherein said detectable object is provided at a position displaced from said axis of rotation by one half of a movement distance of said first base.

* * * * *